United States Patent
Van de Ponseele

(10) Patent No.: US 6,174,576 B1
(45) Date of Patent: Jan. 16, 2001

(54) PERMEABLE ELEMENT, BAG AND COVER MEANS

(76) Inventor: Joseph Van de Ponseele, Koning Boudewijnstraat 30, B-9820 Merelbeke (BE)

( * ) Notice: Under 35 U.S.C. 154(b), the term of this patent shall be extended for 0 days.

(21) Appl. No.: 09/022,670

(22) Filed: Feb. 12, 1998

(51) Int. Cl.⁷ ............................ B32B 3/12; B65D 30/08
(52) U.S. Cl. .................. 428/35.2; 428/35.5; 428/72; 428/74; 428/198; 428/200; 428/201; 428/220; 428/339; 383/116; 383/119; 156/179
(58) Field of Search ................ 428/72, 74, 35.2, 428/76, 35.5, 196, 198, 200, 201, 220, 339; 383/105, 109, 119, 117, 116; 156/176, 179

(56) References Cited

U.S. PATENT DOCUMENTS

| | | | |
|---|---|---|---|
| 5,391,415 | * | 2/1995 | Bair .......................................... 428/74 |
| 5,480,693 | * | 1/1996 | Patterson et al. ....................... 428/72 |
| 5,552,205 | * | 9/1996 | Lea .......................................... 428/74 |
| 5,765,318 | * | 6/1998 | Michelsen ............................... 428/74 |
| 6,020,043 | * | 2/2000 | Schreck ................................... 428/72 |

* cited by examiner

*Primary Examiner*—Rena L. Dye
(74) *Attorney, Agent, or Firm*—Sughrue, Mion, Zinn, Macpeak & Seas, PLLC

(57) ABSTRACT

The invention relates to an element with a determined permeability, said element comprising a first layer and a second layer welded together with interposition of a band of fibers, so as to form a plurality of adjacent welding points, which are separated the one from the other, the fibers of the band having a melting temperature at most 5° C. higher than the melting temperature of at least one of said layers, whereby at the welding points, fibers of the band are molten into the welding lines, so that between two adjacent welding lines, fibers of the band are not molten and form a channel for the exchange of gases but avoiding the passage of solid particles.

35 Claims, 10 Drawing Sheets

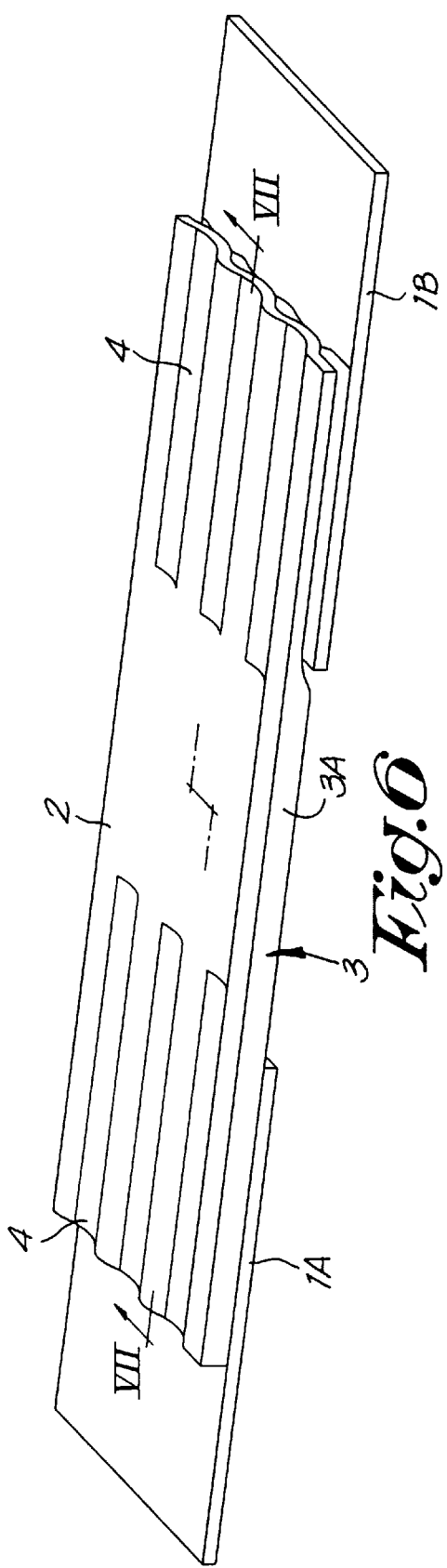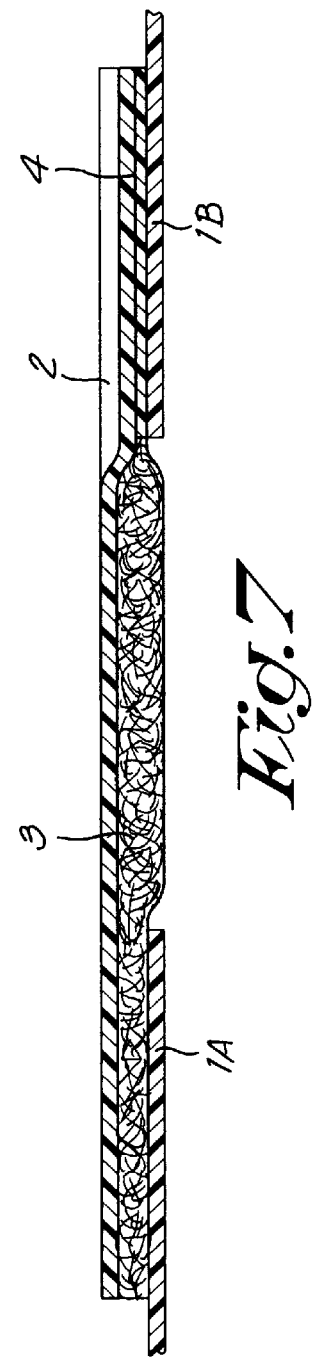

PERMEABLE ELEMENT, BAG AND COVER MEANS

FIELD OF THE INVENTION

Closed bags and containers containing sterilized material, such as medium for mycelium production or in vitro cultures, need to be permeable so as to allow the passage or exchange of gases.

THE STATE OF THE ART

Gas-permeable films have the drawback to have low technical properties. The known films can easily be broken, do not have an accurate determined permeability, have a high desiccation rate.

Therefore, it has been proposed to manufacture bags or receptacles made substantially of non permeable film. In order to ensure that said bags or receptacles are suitable for the incubation of mycelium growing medium, it was therefore necessary to provide one end of the bag with a closing means consisting of paper, cotton, wadding or other microporous material. Such bags or receptacles have the following major drawbacks:
high desiccation rate of the growing material in the neighbourhood of the microporous material;
low content of the bag.

Moreover the permeable bags or films have the drawback that the pores are quickly obstructed by mycelium whereby substantially no gases exchange is anymore possible. The growth of mycelium is very quick near the filter, thereby forming a film or barrier against the passage of oxygen. This film or barrier reduces or even avoids the growth of mycelium located under the film or barrier with respect to the permeable closing. It means when using such bags for mycelium growing material, that the incubation is low, not complete and not uniform.

PCT/BE 94/00064 discloses a film provided with a means consisting of fibres having a melting temperature higher than the welding temperature.

In said film, the channels are formed by a plurality of fibres extending substantially parallel to the axis of the channel. During the welding, a movement of the fibres occurs, whereby the permeability of the channels can greatly vary. Furthermore, a movement of the fibres in the channel is possible. A further problem of the film of PCT/BE 94/00064 was its manufacture as, when the tooth of the welding roller exert a welding pressure on the fibres as well as on the films to be welded instead of only on the film to be welded, the fibres are embedded in the welding. Possibly, channels without fibres are formed between the films.

The invention has for subject matter an element such as a film, a packaging bag, a cover means.

BRIEF DESCRIPTION OF THE INVENTION

The invention relates to an element with a determined permeability, said element comprising a first layer and a second layer welded together with interposition of a band of fibres, so as to form a plurality of adjacent welding points or lines, which are separated the one from the other, the fibres of the band having a melting temperature at most 5° C. higher than the melting temperature of at least one of said layers, preferably of said two layers, whereby at the welding points or lines, fibres of the band are molten into the welding points or lines, so that between two adjacent welding points or lines, fibres of the band are not molten and form passage or channel for the exchange of gases but avoiding the passage of solid particles.

The wording "Welding points" means distinct single welding points or a plurality of welding points forming a pattern such as a line.

Preferably, the melting temperature of the fibres is substantially equal to the melting temperature of the layers.

When the first layer and the second layer are welded together by means of welding points, the passage formed between two adjacent welding points has preferably a substantially lenticular cross section, the maximum height of said passage being comprised between 50 $\mu$m and 250.

Advantageously, parts of fibres of the band forming a channel are attached to at least one welding line, preferably to at least two welding lines.

According to an embodiment, the band of fibres is a mat of fibres. In said embodiment, a plurality of channels are formed, each channel having a substantially cylindrical or lenticular shape with a central axis and extending between two adjacent welding lines, some fibres of the mat of a channel which extend in a direction forming an angle of 45 to 90° with respect to the central axis being attached the two adjacent welding lines of said channel.

Preferably, the channels have a substantially circular or lenticular cross section, the height or thickness of which is comprised between 50 $\mu$m and 250 $\mu$m.

According to possible embodiments, the channels have a length comprised between 2 mm and 10 mm, and a width comprised between 50 $\mu$m and 2 mm.

As fibres, it is advantageous to use fibres with a thickness or diameter lower than 10 $\mu$m, preferably lower than 5 $\mu$m and most preferably lower than 2 $\mu$m.

Preferably, the band of fibres has a thickness comprised between 50 and 500 $\mu$m, and most preferably between 50 and 100 $\mu$m. The density of the band before welding is advantageously less than 1000 g/m$^2$, preferably less than 500 g/m$^2$.

According to another embodiment, the channels have each a central axis, the central axis of said channels intersecting each together substantially in a point. The channels are formed by the micro porosity defined between the fibres of the mat.

According to a further embodiment, the channels extend each between a first end and a second end and have a variable width, said width being substantially minimum at said first end and substantially maximum at said second end.

Preferably, the fibres and the layers are made of the same material. When using the same material, the recycling of the element or film provided with channels is possible and easy to carry out. Material which is particularly suitable is polyethylene, polypropylene, and most preferably a mixture of polypropylene and polyethylene, the said mixture containing advantageously from 70 to 97.5% (preferably 90 to 95%) polypropylene and from 2.5 to 30% (preferably 5 to 10%) polyethylene. By using polypropylene or such mixture, the element according to the invention can be sterilized at temperature of 100–120° C. without problems.

The invention relates also to a cover means for closing a container, at least a part of said cover means consisting of an element with a determined permeability, said element comprising a first layer and a second layer welded together with interposition of a band of fibres, so as to form a plurality of adjacent welding points or preferably welding lines, which are separated the one from the other, the fibres of the band having a melting temperature at most 5° C. higher than the melting temperature of at least one of said layers, preferably of said two layers, whereby at the welding points or lines, fibres of the band are molten into the welding points or lines, so that between two adjacent welding points or lines, fibres of the band are not molten and form a passage or channel for the exchange of gases but avoiding the passage of solid particles.

Advantageously, parts of fibres of the band forming a channel are attached to at least one welding line, preferably to at least two adjacent welding lines.

According to a preferred embodiment, the band of fibres is a band of fibres and in which a plurality of channels are formed, each channel having a cross section with a substantially cylindrical or lenticular shape and with a central axis, said channel extending between two adjacent welding lines, some fibres of the band of a channel which extends in a direction forming an angle of 45 to 90° with respect to the central axis being attached to the two adjacent welding lines of said channel.

The invention relates further to a plastic bag for containing sterilized material, at least a part of said bag consisting of an element comprising a first layer and a second layer welded together with interposition of a band of fibres, so as to form a plurality of adjacent welding points or lines, which are separated the one from the other, the fibres of the band having a melting temperature at most 5° C. higher than the melting temperature of at least one of said layers, preferably of said two layers, whereby at the welding points or lines, fibres of the band are molten into the welding lines, so that between two adjacent welding points or lines, fibres of the band are not molten and form a passage or channel for the exchange of gases but avoiding the passage of solid particles.

Advantageously, parts of fibres of the band forming a channel are attached to at least one welding line, preferably to at least two adjacent welding lines.

According to a preferred embodiment, the band of fibres is a band of fibres in which a plurality of channels are formed, each channel having a cross section with a substantially cylindrical or lenticular shape and with a central axis, said channel extending between two adjacent welding lines, some fibres of the band of a channel which extends in a direction forming an angle of 45 to 90° with respect to the central axis being attached the two adjacent welding lines of said channel.

A further subject matter of the invention is a process for the manufacture of an element, such as a film, a cover, a bag, ... with a determined permeability, said element comprising a first layer and a second layer welded together with interposition of a band of fibres, so as to form a plurality of adjacent welding points or lines, which are separated the one from the other, the fibres of the band having a melting temperature at most 5° C. higher than the melting temperature of at least one of said layers, preferably of said two layers, whereby at the welding points or lines, fibres of the band are molten into the welding points or lines, so that between two adjacent welding points or lines, fibres of the band are not molten and form a passage or channel for the exchange of gases but avoiding the passage of solid particles. The said process has advantageously the following steps:
the band of fibres, preferably a mat of fibres, is inserted between the two layers, and
the two layers are molten together with interposition of the fibres band so as to form adjacent welding points or lines in which fibres are molten, and so as to form between two adjacent points or lines a channel consisting of parts of fibres which do not melt during the welding.

The welding is preferably an ultrasonic welding. Said welding is carried out when the layers and the band are pressed together.

Preferably, the band of fibres is compressed between the films before welding and is maintained compressed during the welding, the compressed band having a thickness corresponding to at most 75% of the thickness of the band before being compressed.

Advantageously, the films are stretched during the welding.

BRIEF DESCRIPTION OF THE DRAWINGS

FIG. 6 is a view similar to FIG. 1 of a further embodiment according to the invention;

FIG. 7 is a cross section view (on enlarged scale) of FIG. 6 along the line VII—VII;

FIG. 12 is a schematic view of a welding machine suitable for the manufacture of an element of the invention

DESCRIPTION OF PREFERRED EMBODIMENTS

Figure 1:
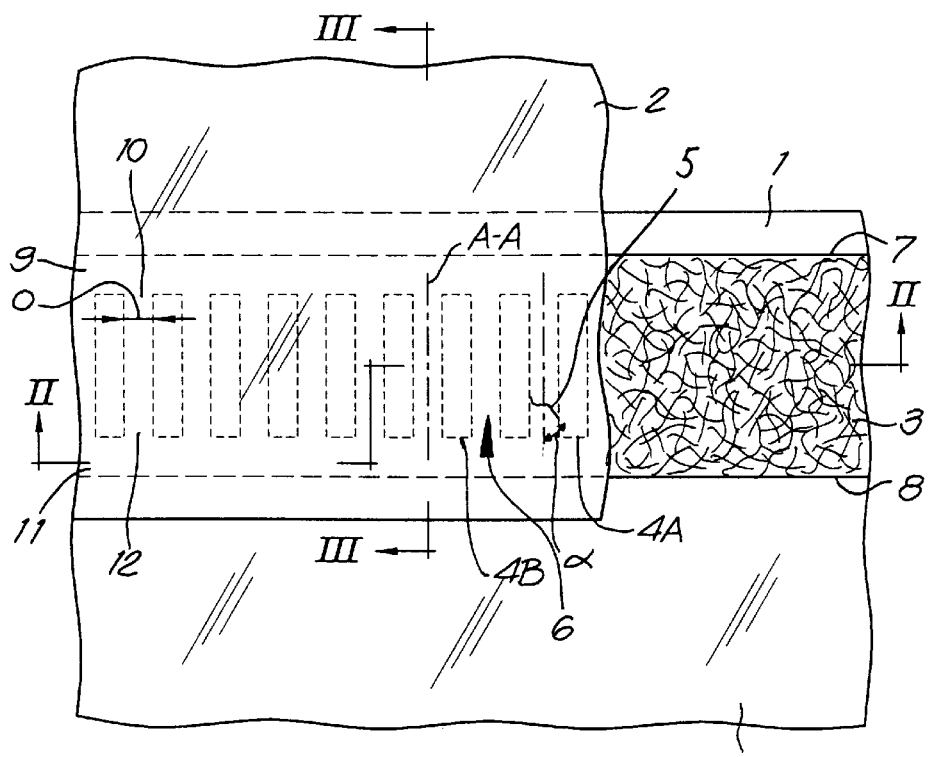
FIG. 1 is an upper view of an element according to the invention.

FIG. 1 shows an element with a determined permeability, said element comprising a first layer or film 1 and a second layer or film 2 welded together with interposition of a band 3 of fibres, so as to form a plurality of adjacent welding lines 4 which are separated the one from the other (distance d), the fibres of the band 3 having a melting temperature substantially equal to the melting temperature of at least one of said layers or films 1 and 2, whereby at the welding lines 4, fibres of the band are molten into the welding lines. The layers or films are made from a mixture of 95% polypropylene and 5% polyethylene and had a thickness of about 75 µm. The band 3 of fibres is a mat of fibres made of polypropylene and having a diameter lower than 1 µm. The thickness of the band was 500 μm before welding and less than 300 μm after welding. The density of the band 3 before welding is 250 g/m². Between two adjacent welding lines, fibres of the band are not molten and form a channel 6 for the exchange of gases but avoiding the passage of solid particles.

Parts of fibres 5 of the band 3 forming a channel 6 are attached to at least one welding line 4. Preferably, fibres have a first part attached to a first welding line 4A and a second part attached to another welding line 4B (adjacent to the first welding line).

The band 3 of fibres is preferably a mat of fibres. A plurality of adjacent channels 6 are formed, each channel 6 having a cross section with a substantially cylindrical or lenticular shape with a central axis A—A, each channel extending between two adjacent welding lines 4A, 4B. Some fibres 5 of the mat of a channel 6 extend in a direction forming an angle α of 45 to 90° with respect to the central axis A—A and are attached to the two adjacent welding lines 4A, 4B of said channel 6.

The channels 6 have a substantially lenticular cross section, the thickness or height E of which (see FIG. 3) is comprised between 300–350 μm. The channel for the exchange of gases has, in cross section, concave end parts 63 adjacent to the welding lines 6 and a central convex part 64 between the parts 63. Such cross section of the channel 6 is advantageous for preventing damage of the welding when exerting a tearing or peeling force on the films 1 and 2.

Figure 3:
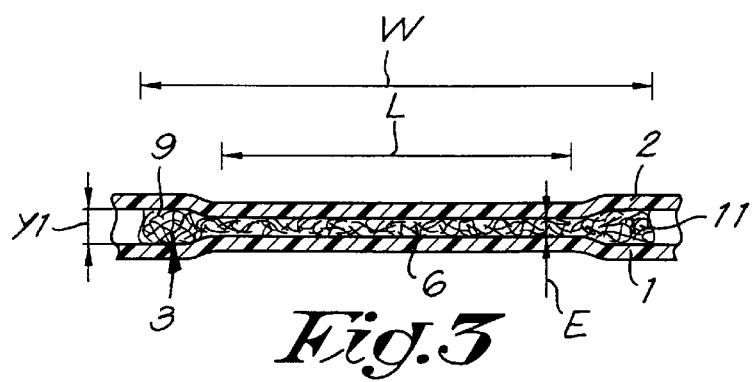
FIG. 3 is a cross section view of the element of FIG. 1 along the line III—III.
Figure 4:
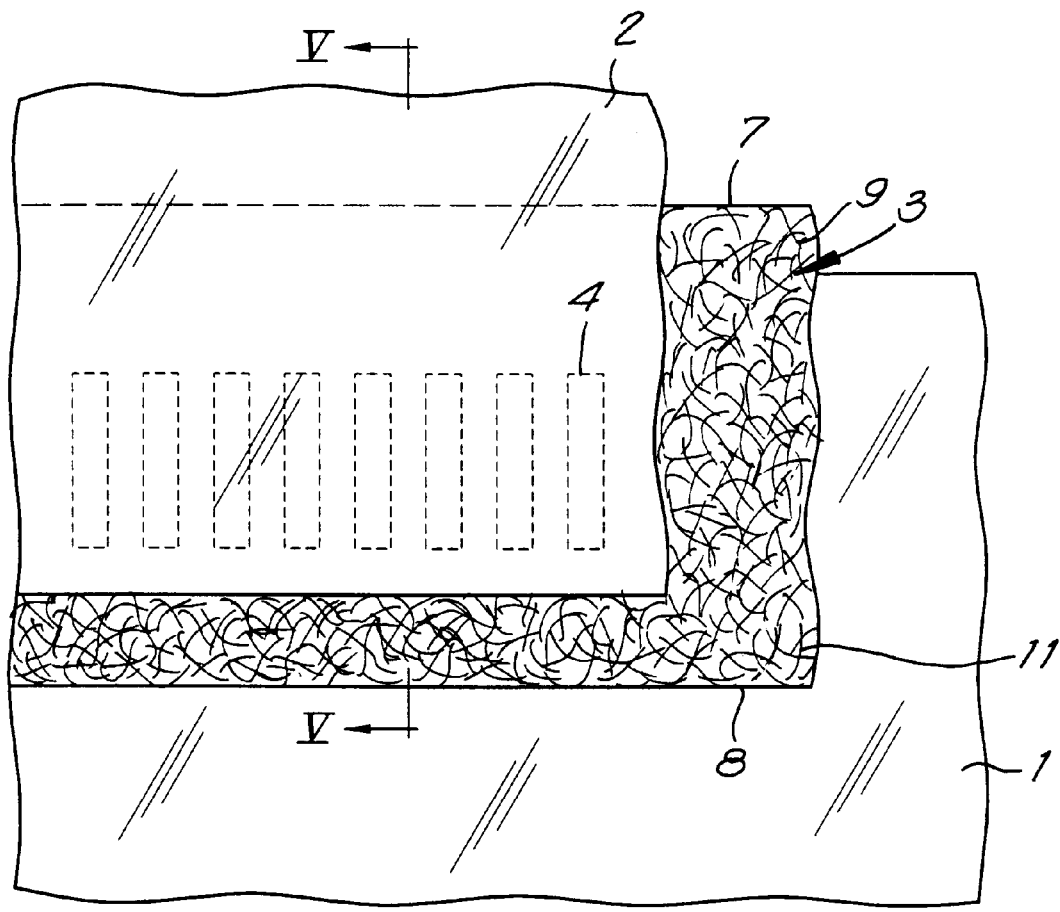
FIG. 4 is a view similar to FIG. 1 of another embodiment according to the invention.
Figure 5:
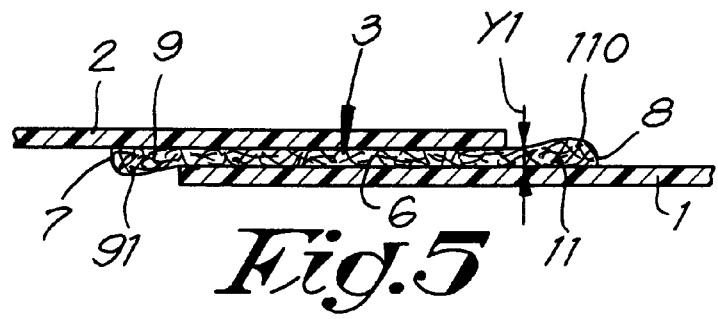
FIG. 5 is a cross section view of FIG. 4 along the line V—V.

The length L of the channel 6 is for example 8 mm (see FIG. 3).

Figure 2:
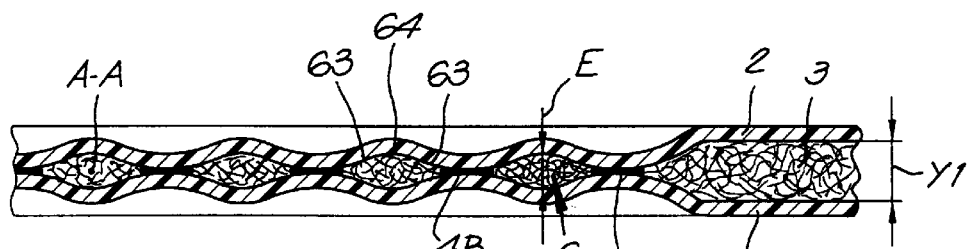
FIG. 2 is a cross section view of the element of FIG. 1 along the line II—II.

The fibres of the mat 3 have a thickness of less than about 1 μm, while the total thickness of the mat is about 0.5 mm before welding (Y1 in FIG. 2) and 0.35 mm (E, FIG. 3) after welding between two adjacent welding lines.

The films 1 and 2 and the fibres are made of substantially the same material (polypropylene) and have substantially the same melting points.

The channel 6 extends from a first end up to a second end, whereby gases can flow in the channel, i.e. can act for the exchange of gases. However the voids of the channel 6 are such that the passage of solid particles, microorganisms are prevented.

The welding lines 4 are preferably made by ultrasonic welding. The welding lines 4 have a length L lower than the width W of the band 3, whereby the lateral edges 9,11 of the mat of fibres are not welded to the films 1,2 and form respectively a link between the inlet of the channel 6 and a link between the outlet of the channel 6. Due to the fact that said lateral edges 9,11 of the mat 3 are not welded, said lateral edges 9,11 have substantially a thickness corresponding to the thickness Y1 of the mat before welding. The voids or pores of the said lateral edges have a greater diameter than the diameter of the pores or voids of the channel 6 between two adjacent welding lines. This is advantageous, as the larger particles are stopped in the lateral edges 9,11, while the smaller particles which possibly flow through the said lateral edges are stopped in the channel 6. Due to this fact a better and substantially constant exchange of gases through the channels 6 can be maintained during a long period of time.

The machine 1000 shown in FIG. 12 is a machine for manufacturing an element according to the invention (such as shown in FIG. 1), said machine comprising a supporting element 1001;

supporting axis 1002 attached to the supporting element 1001, said axis being rotating freely with respect to the supporting element and being provided with braking means 1003;

a supporting shaft 1004 driven into rotation R3 by a motor 1005 a wheel 1006 provided with teeth 1007, said wheel 1006 rotating freely with respect to the supporting element 1001;

supporting cylinders 1008 rotating freely with respect to the supporting element 1001, said cylinders guiding the films 1,2 and the band of fibres 3 towards the wheel 1007 before welding and towards the shaft 1004 after welding;

a welding head 1009 which is movable (arrow P) towards the wheel 1006 by a system 1010 such as a jack, said welding head being an ultrasonic welding head.

Feed cylinders 1011 are fixed on the supporting axis 1002 for feeding the machine with films 1 and 2 and with fibres band 3. The said films 1,2 and fibres band 3 are moved (M) towards each other so that the band 3 is pressed between the films 1,2. The welded films are coiled on the roller 1012 attached to the shaft 1004. Due to the driving of the shaft 1004 (whereby the films and the band are moved (arrow M)), due to the brakes 1003 acting on the uncoiling of the films and band from the feed cylinders 1011, and due to the position of the guiding cylinders 1008 adjacent to the wheel 1006, the films 1 and 2 and the band 3 are pressed together against teeth 1007 of the wheel 1006. Due to the pressure exerted by the films on the wheel 1006 and due to the movement M of the films, the wheel 1006 is driven into rotation (R4).

The pressure exerted during the welding is advantageous for preventing solid particles, microorganisms and liquid to flow through the channel. Due to said pressure, after the welding, the fibres of the channel 4 are pressed together.

FIG. 15 to 18 show in cross section the films and the mat at different positions thereof with respect to the wheel 1006. FIG. 15 to 18 correspond respectively to the positions Q1,Q2,Q3,Q4 of the films with respect to the wheel 1006.

The teeth 1007 of the wheel 1006 have each a flat free outer end face 1007A and curved lateral edge 1007B. A groove 1007C is defined between the curved lateral edges of two adjacent teeth 201, said groove having advantageously a curved bottom (see FIG. 18). The teeth 1007 have a height HT which is greater than the total thickness of the films and mat of fibres to be welded together, so as to avoid that the film 2 contacts the bottom of the groove 1007C and so as to ensure that the mat is compressed by the films 1 and 2. The films 1,2 are stretched during the welding (this is due to the brakes 1003 and the coiling up by the motor 1005), whereby after the said welding the elasticity of the films ensures that a pressure is still exerted on the part of the mat forming a channel between two welding lines.

Figure 15:
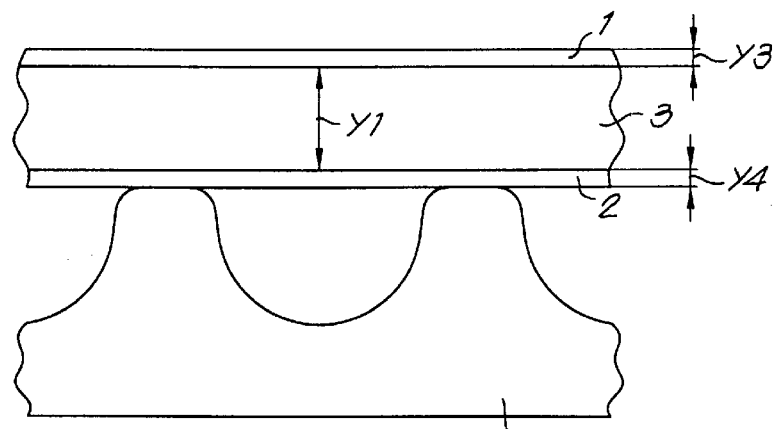
FIGS. 15 to 18 are partial enlarged views of a cylinder provided with teeth showing the contact of the films to be welded with the cylinder, the deformation of the said films before welding, the welding of the films and the removal of the welded films from said cylinder.
Figure 16:
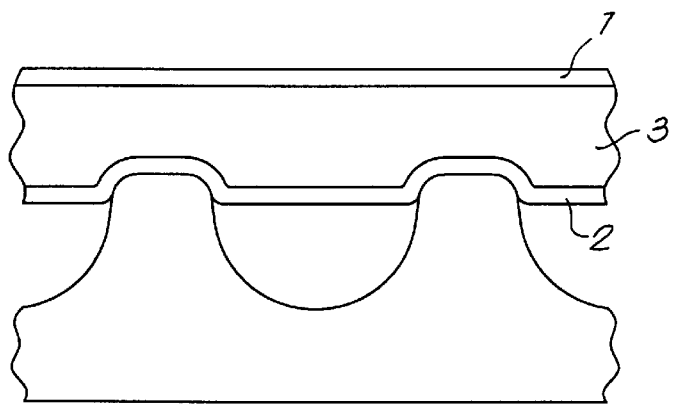
Figure 17:
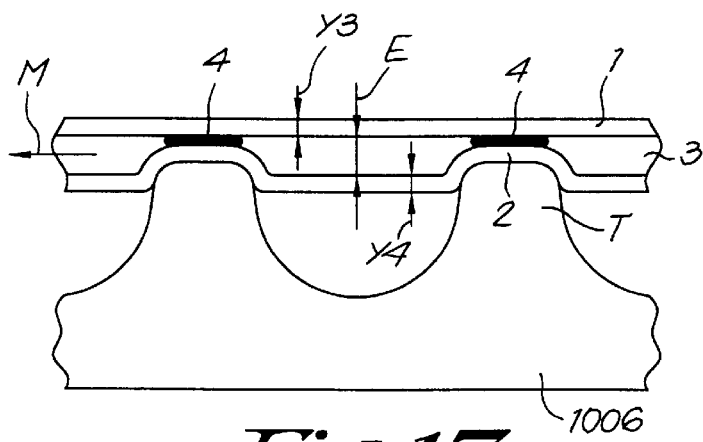
Figure 18:
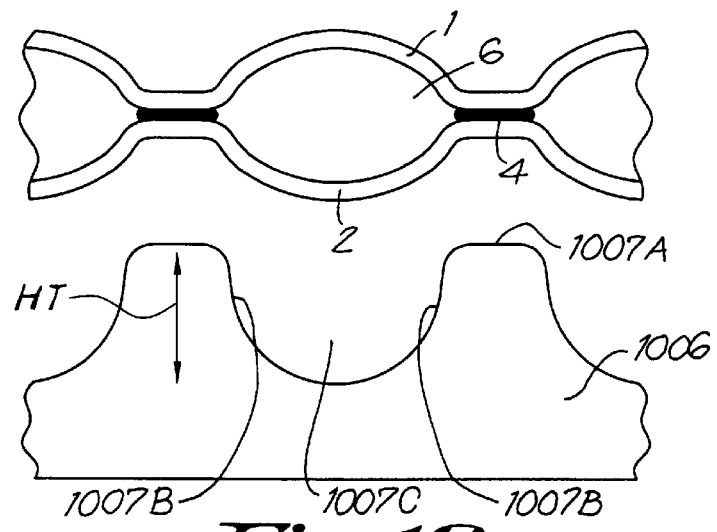

As it can be seen, the films 1,2 and the mat 3 are pressed against the teeth of the wheel 1006. Due to said pressure, the mat 3 is compressed, i.e. the thickness of the mat is lowered (from a thickness Y1 before being pressed, to a minimal thickness E during the welding). Said compression of the mat 3 is shown in FIG. 15 to 17. In the FIG. 17, the thickness of the mat 3 is minimal. In this position the parts of the films 1,2 located above the tooth T are welded together. Due to the heat, the part of the mat 3 located between the films 1,2 at the welding line 4 is molten, whereby due to the pressure the thickness Y2 of the welding line 4 corresponds substantially to the sum of the thickness Y3,Y4 of the two films 1,2.

After welding, the part of the mat 3 located between two adjacent welding lines 4 remains compressed and forms a gas-permeable channel 6 with a cross section having a substantially lenticular shape. (see FIG. 18) In FIG. 18, the welded films do no more contact the teeth 1007 of the wheel. similar to the embodiment shown in FIG. 1, except that the mat 3 is only partly covered by the films 1 and 2. The lateral edge 9 of the mat 3 (adjacent to the end 7) is covered by the film 2, while the lateral edge 11 of the mat 3 (adjacent to the end 8) is covered by the film 1. The thickness Y1 of the lateral edges or parts 9,11 correspond substantially to the thickness of the mat before welding. This embodiment is advantageous as the surface 110 of the lateral edge 11 is suitable for filtering the gases to flow through the channel 6, i.e. for stopping the larger particles, whereby the clogging of the mat is retarded. In the same way the surface 91 of the lateral edge or part 9 acts as filtering means for stopping the larger particles so as to prevent a too rapid clogging of the channels 6.

FIG. 6 is a further view of an element according to the invention. In this embodiment, two films 1A,1B are separated the one from the other and are partly covered by a mat of fibres 3, which is covered by a film 2. The film 2 is welded with the films 1A and 1 B with interposition of the mat 3 by means of two series of welding lines 4. Between two adjacent welding lines 4 of a series a channel 6 is formed. The mat of fibres 3 has a part 3A located between the welding lines 4 of the first series and the welding lines 4 of the second series. Said part 3A is not compressed. Said part 3A can be directed towards the inner or the outer volume of the container or bag.

This embodiment is advantageous as the said part 3A is suitable for filtering the gases to flow through the channel 6, i.e. for stopping the larger particles of the material contained in the bag or container, whereby the clogging of the mat, as well as the clogging of the channel are retarded. Furthermore, this embodiment is advantageous as it permits a high exchange of gas through the channels for a small surface of film.

Figure 8:
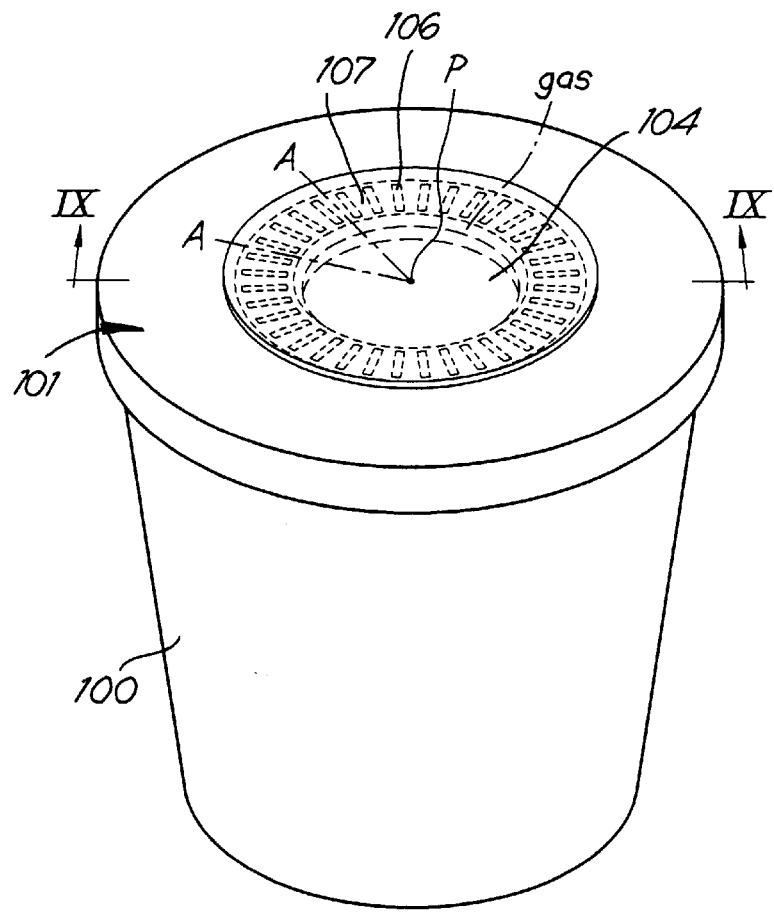
FIG. 8 is a perspective view of a container provided with a cover according to the invention.
Figure 9:
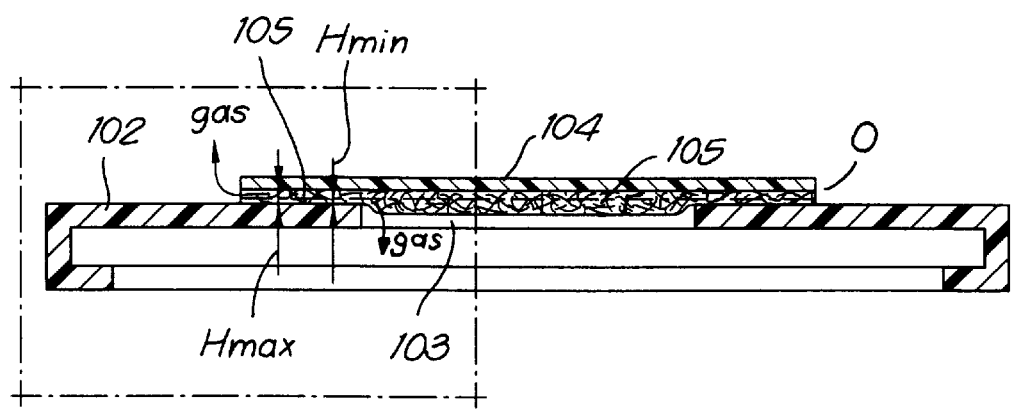
FIG. 9 is a cross section view of the cover of FIG. 8.

FIG. 8 shows a packaging system consisting of a container 100 provided with a cover 101. The cover 101 is circular and consists of (a) a first plate or film 102 with a central hole 103, (b) a second plate or film 104 covering the hole 103 as well as partly the first plate or film 102, (c) a mat of fibres 105 between the first film 102 and the second film 104, and (d) several adjacent welding lines 106 linking the first film to the second film and where the fibres are molten. Between two adjacent welding lines 106, a channel 107 is formed so as to permit an exchange of gases between the inner side I of the container and the outer side O of the container (arrow Gas).

The channels 107 are radial channels i.e. the intersection of their central axis A—A is a central point P.

Figure 10:
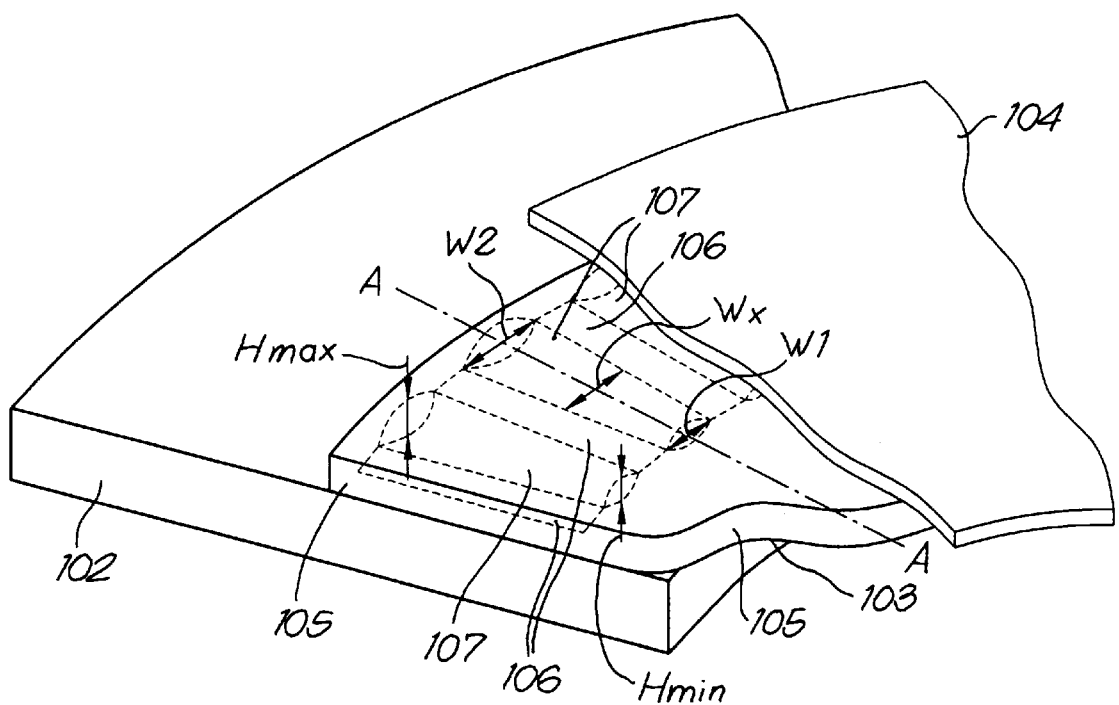
FIG. 10 is an enlarged view of a detail of the cover of FIG. 8

Details of said embodiment are shown in FIG. 10.

The width Wx (measured perpendicular to the axis A—A) of the channels 107 varies from a minimum width W1 at the end adjacent to the central point to a maximum width W2 at the other end of the channel. The width W2 is greater near the outside O of the channel and is smaller near the inside edge of the channel 107. This is advantageous so that the filtering volume of the channel is greater near its end adjacent to the outside, i.e. there is a large volume free for stopping solid particles, i.e. for preventing particles to flow from the outside towards the inside I, while permitting gases to flow through the channel 107. The clogging risk of the channel is reduced and a good gas exchange through the channels 107 can be maintained during a long period.

The thickness of the mat was 0.5 mm before welding and less than about 0.35 mm between two adjacent welding lines 106, while the fibres had a diameter of less than 1 $\mu$m and a length between 1 and 2 cm. The thickness of the channel 107 varies between a minimum Hmin near the end 107A directed towards the inner volume of the container 100, and a maximum Hmax near the end 107B directed towards the outer side of the container. The filtering volume near the end 107B is formed with pores with a diameter larger than the diameter of the pores forming the filtering volume near the end 107A. The filtering volume near the end 107B is greater than the filtering volume near the end 107A. This embodiment is advantageous for stopping particles and preventing them to flow from the outer side O of the cover into the container(I), while preventing also a too rapid clogging of the channel 107.

Figure 11:
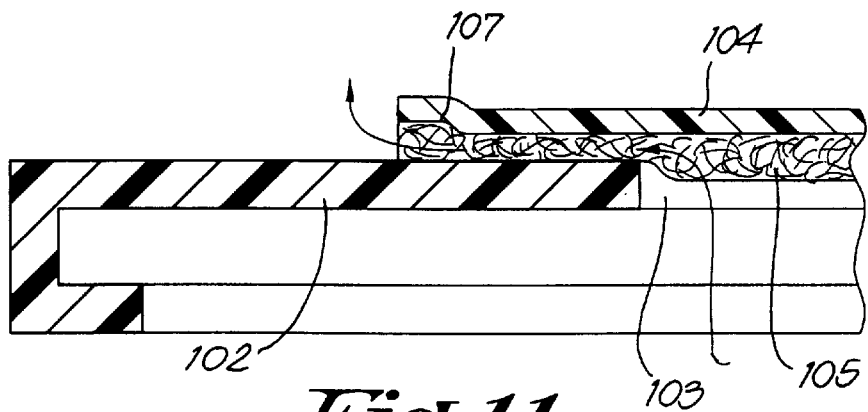
FIG. 11 is a perspective view of another container according to the invention.

Possibly the mat of fibres could also cover the opening 103 of the first sheet 102 so as to prevent a quick clogging of the channels 106 by means of particles issuing from the material contained in the container 100 (see FIG. 11).

Figure 13:
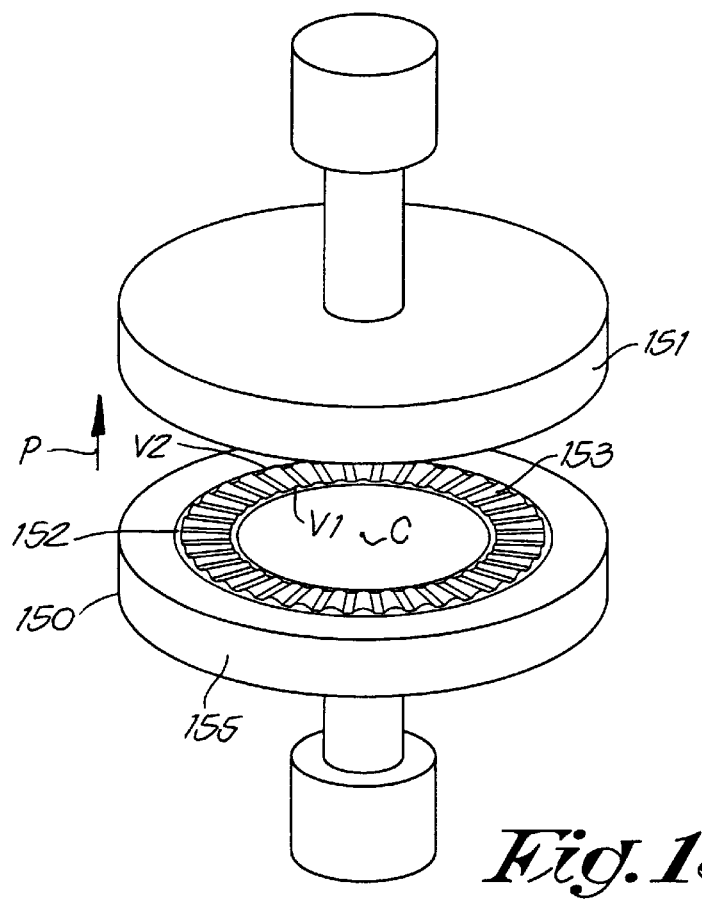
FIG. 13 is a perspective view of another welding machine.

FIG. 13 shows a welding plate 150 which is suitable for welding together the films 102, 104 of the cover 101. The welding plate 150 is moved (arrow P) towards a flat plate 151 so as to press, while welding, the films 102, 104 and the mat of fibres 105 together. The plate 150 is provided with a ring 152 with teeth 153, whereby between two adjacent teeth a groove is formed. Each tooth has a top end edge V1 adjacent to the center C of the plate 150 and a top end edge V2 adjacent to the outer edge 155 of the plate 150. The distance separating the top end edges V1 of two adjacent teeth is lower than the distance separating the top end edges V2 of said adjacent teeth.

Figure 14:
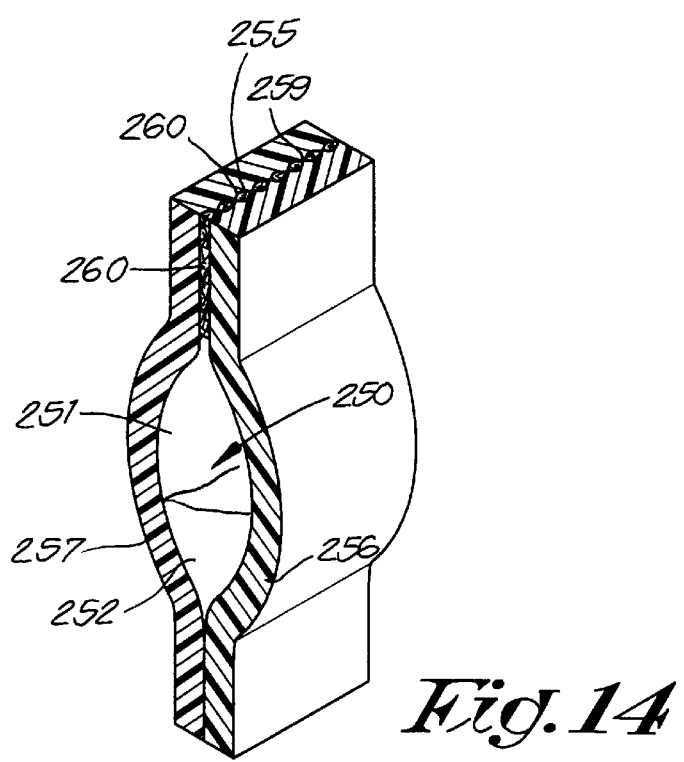
FIG. 14 is a cross section view of a bag according to the invention

FIG. 14 shows a bag 250 containing a gas 251 or a liquid 252 which can be evaporated. The bag 250 is provided with an edge 255 at which two parts 256, 257 of the bag are welded together with interposition of the fibres band 258 (welding lines 259) so as to form a plurality of channels 260.

Figure 19:
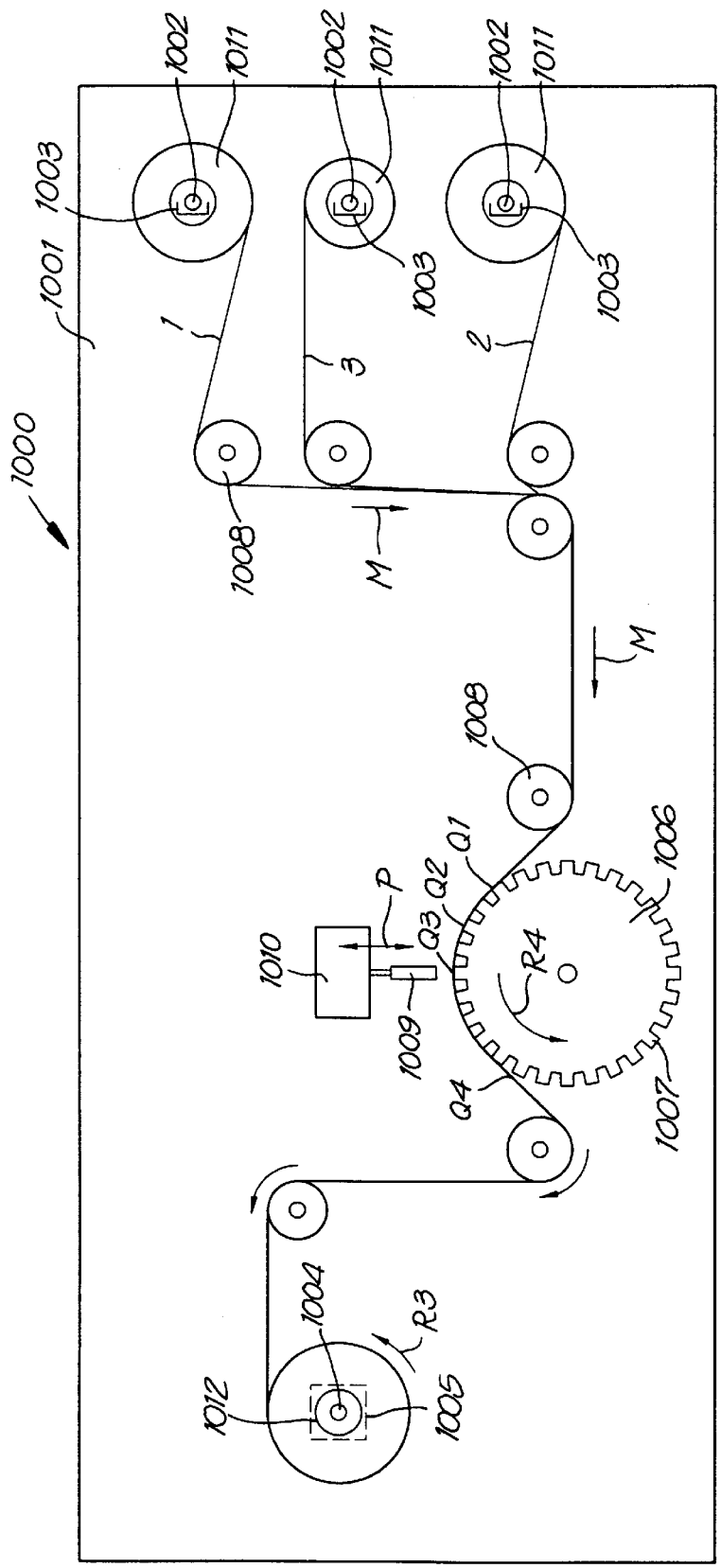
FIG. 19 is a perspective view (with cross sections) of a further embodiment according to the invention.

FIG. 19 is a further view of a container provided with a cover. Said container 100 and cover 101 are similar to the container and cover shown in FIG. 8, except that the container 100 has a rectangular shape, that the cover 101 is formed by a plurality of films 1,2 welded together with interposition of a mat of fibres 3, and that after closing the container by means of the cover, the cover is welded to the container so as to prevent any passage of acarids or other small animals between the cover and the container and so as to prevent any passage of particles and microorganisms between the cover and the container. For example, the upper edge 100A of the container is provided with a flange 100B, while the cover has along its edge a element 101A intended to contact the said flange 100B. The said element 101A and Flange 100B are welded together (welding line 111) so as to ensure a continuous sealing all along the edge 100A.

Figure 20:
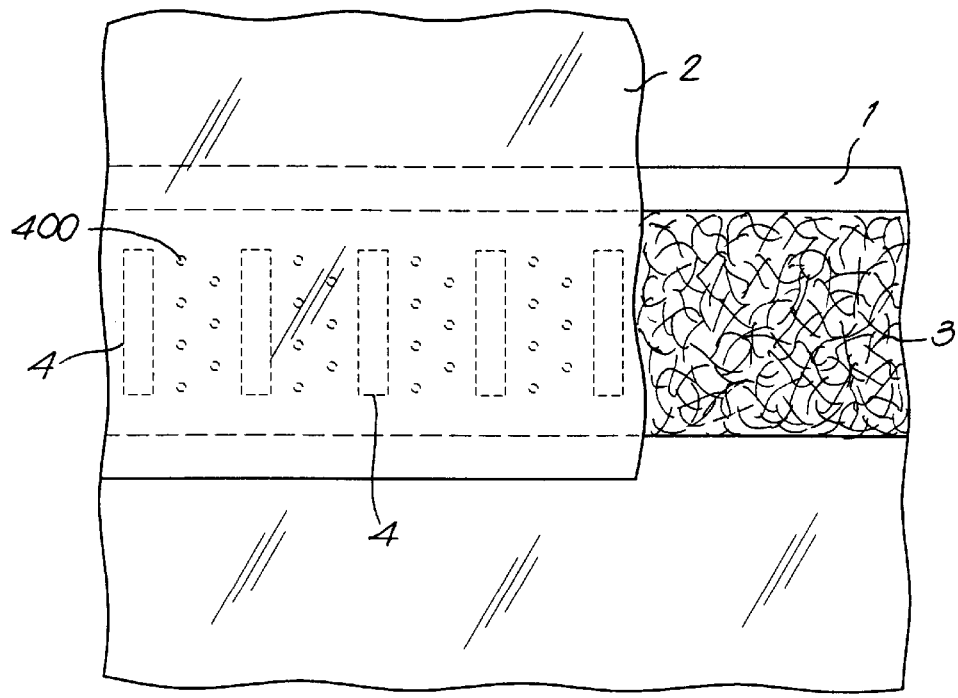
FIG. 20 is a further view (upper view) of an element according to the invention.
Figure 19:
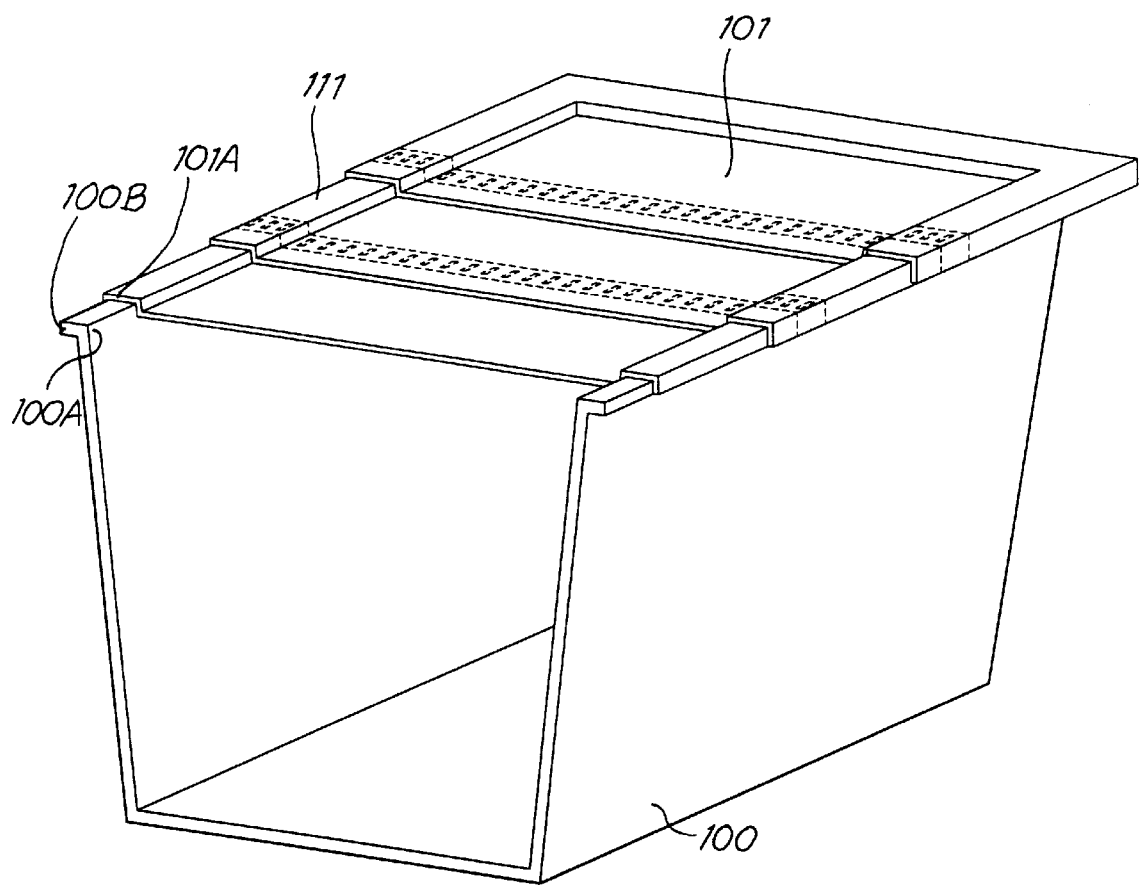

FIG. 20 shows an element with a determined permeability similar to that shown in FIG. 1. The said element comprises a first layer or film 1 and a second layer or film 2 welded together with interposition of a band 3 of fibres, so as to form a plurality of adjacent welding points 400 and lines 4 which are separated the one from the other (distance d), the fibres of the band 3 having a melting temperature substantially equal to the melting temperature of at least one of said layers or films 1 and 2, whereby at the welding points and lines 4, fibres of the band are molten into the welding points and lines. The layers or films are made from a mixture of 95% polypropylene and 5% polyethylene and had a thickness of about 75 $\mu$m. The band 3 of fibres is a mat of fibres made of polypropylene and having a diameter lower than 1 $\mu$m. The thickness of the band was 500 $\mu$m before welding and less than 300 $\mu$m after welding. The density of the band 3 before welding is 250 g/m$^2$.

Between two adjacent welding points and/or lines, fibres of the band are not molten and form a channel 6 for the exchange of gases but avoiding the passage of solid particles.

Between two adjacent welding points 400, a passage is formed. Said passage has a substantially lenticular cross section, the maximum height of said passage being comprised between 50 μm and 250 μm.

Advantages of the gas permeable element, cover, films of the inventions are:

- the filtration is carried out through the band or mat of fibres (depth filtration);
- by using hydrophobic material, the passage of water or condensation water is prevented;
- prevent a visible drying of mycelium or other growing material;
- micro channels are formed between the fibres of each of the channel, the diameter of said micro channels being less than 10 μm (preferably less than 2 μm);
- fibres of the channel have parts welded with the films at the welding lines, whereby the stability of the shape of the channel is improved and can be maintained even after folding or rolling the welded films;
- a volume exchange ratio of oxygen with respect to $CO_2$ in the channel of between 2 and 5 hours$^{-1}$ can be reached.

What I claim is:

1. An element with a determined gas permeability, said element comprising a first layer and a second layer connected the one to the other by a welding zone wherein the first layer and the second layer are welded together with interposition of a band of fibres at welding points, the fibres of the band having a melting temperature at most 5° C. higher than the melting temperature of at least one of said layers, whereby, at the welding points of the welding zone, fibres of the band are molten into the welding points, while between two adjacent welding points of the welding zone, fibres of the band are not molten, whereby a plurality of adjacent welding points are formed and separated the one from the other so as to form, in the band of fibres of the welding zone, channels for the exchange of gases through the fiber band, while avoiding the passage of solid particles through the fiber band.

2. The element of claim 1 for the exchange of gases between a first medium and a second medium, in which the channels for the exchange of gases through the fiber have first ends attached to a first portion of the band and second ends attached to a second portion of the band, said first portion being open towards a first medium, while said second portion is open towards a second medium, so that the exchange of gases between the first medium and the second medium is carried out through said channels and said first and second portions of the band.

3. The element of claim 1, in which the first layer and the second layer are welded together in a welding zone with interposition of a band of fibres, by means of a plurality of adjacent welding lines, which are separated the one from the other so as to define a plurality of channels in the welding zone, parts of fibres of the band, forming a channel in the welding zone, being attached to at least one welding line, whereby said channels formed in the welding zone have a substantially lenticular cross section with a maximum height comprised between 50 μm and 250 μm.

4. The element of claim 3, in which the channels of the welding zone have a length comprised between 2 mm and 10 mm.

5. The element of claim 3, in which the channels of the welding zone have a width comprised between 50 μm and 2 mm.

6. The element of claim 3, in which the fibres of the band have a thickness lower than 10 μm.

7. The element of claim 3, in which the fibres of the band have a thickness lower than 1 μm.

8. The element of claim 3, in which the band of fibres has a first portion located in the welding zone and a second portion located outside the welding zone, said second portion having a thickness comprised between 50 and 500 μm.

9. The element of claim 3, in which the channels of the welding zone have each a central axis, the central axis of said channels intersecting each together substantially in a point.

10. The element of claim 3, in which the channels of the welding zone extend each between a first end and a second end and have a variable width, said width being substantially minimum at said first end and substantially maximum at said second end.

11. The element of claim 3, in which a plurality of channels are formed between the welding lines of the welding zone, each channel defined in the welding zone having a substantially lenticular cross section and a central axis, said channel extending between two adjacent welding lines of the welding zone, some fibres of the band of a channel which extends in a direction forming an angle of 45 to 90° with respect to the central axis being attached to the two adjacent welding lines between which said channel is formed.

12. The element of claim 3, in which the fibres of the band and the first and second layers are made of material having substantially the same melting temperature.

13. The element of claim 1, in the form of a cover means for closing a container.

14. The element of claim 1, in the form of a plastic bag for containing sterilized material.

15. A process for the manufacture of the element defined in claim 1, comprising the following steps:

A) insertion of the band of fibres between the two layers, and
   B) welding together the two layers with interposition of the band of fibres so as to form adjacent welding points in which fibres are molten, and so as to form between two adjacent points a passage consisting of parts of fibres which do not melt during the welding.

16. An element with a determined gas permeability, said element comprising a first layer and a second layer connected the one to the other by a welding zone wherein the first layer and the second layer are welded together with interposition of a band of fibres at welding points, the fibres of the band having a melting temperature at most 5° C. higher than the melting temperature of at least one of said layers, whereby, at the welding points of the welding zone, fibres of the band are molten into the welding points, while between two adjacent welding points of the welding zone, fibres of the band are not molten, whereby a plurality of adjacent welding points are formed and separated the one from the other so as to form, in the band of fibres of the welding zone, channels with a substantially lenticular cross section with a maximum height comprised between 50 μm and 250 μm for the exchange of gases through the fiber band, while avoiding the passage of solid particles through the fiber band.

17. The element of claim 16, wherein the channels formed between the welding points are characterized by a volume exchange ratio of oxygen with respect to $CO_2$ of between 2 and 5 hours$^{-1}$.

18. The element of claim 16 for the exchange of gases between a first medium and a second medium, in which the channels for the exchange of gases through the fiber have first ends attached to a first portion of the band and second ends attached to a second portion of the band, said first portion being open towards a first medium, while said second portion is open towards a second medium, so that the exchange of gases between the first medium and the second medium is carried out through said channels and said first and second portions of the band.

19. Cover means for closing a container, at least a part of said cover means consisting of an element with a determined gas permeability, said element comprising a first layer and a second layer connected the one to the other by a welding zone wherein the first layer and the second layer are welded together with interposition of a band of fibres at welding points, the fibres of the band having a melting temperature at most 5° C. higher than the melting temperature of at least one of said layers, whereby, at the welding points of the welding zone, fibres of the band are molten into the welding points, while between two adjacent welding points of the welding zone, fibres of the band are not molten, whereby a plurality of adjacent welding points are formed and separated the one from the other, so as to form in the band of fibres of the welding zone, channels for the exchange of gases through the fiber band, while avoiding the passage of solid particles through the fiber band.

20. The cover means of claim 19, in which the first layer and the second layer are welded together in the welding zone with interposition of a band of fibres, by means of a plurality of adjacent welding lines, which are separated the one from the other so as to define a plurality of channels in the band of fibres of the welding zone, parts of fibres of the band forming a channel being attached to at least one welding line.

21. The cover means of claim 20, in which parts of fibres of the band forming a channel are attached to at least one welding line.

22. The cover means of claim 20, in which a plurality of channels are formed between the welding lines of the welding zone, each channel defined in the welding zone having a substantially lenticular cross section and a central axis, said channel extending between two adjacent welding lines of the welding zone, some fibres of the band of a channel which extends in a direction forming an angle of 45 to 90° with respect to the central axis being attached to the two adjacent welding lines between which said channel is formed.

23. The cover means of claim 19 for the exchange of gases between a first medium and a second medium, in which the channels for the exchange of gases through the fiber have first ends attached to a first portion of the band and second ends attached to a second portion of the band, said first portion being open towards a first medium, while said second portion is open towards a second medium, so that the exchange of gases between the first medium and the second medium is carried out through said channels and said first and second portions of the band.

24. A cover means for closing a container, at least a part of said cover means consisting of an element with a determined gas permeability, said element comprising a first layer and a second layer connected the one to the other by a welding zone wherein the first layer and the second layer are welded together with interposition of a band of fibres at welding points, the fibres of the band having a melting temperature at most 5° C. higher than the melting temperature of at least one of said layers, whereby, at the welding points of the welding zone, fibres of the band are molten into the welding points, while between two adjacent welding points of the welding zone, fibres of the band are not molten, whereby a plurality of adjacent welding points are formed and separated the one from the other so as to form, in the band of fibres of the welding zone, channels with a substantially lenticular cross section with a maximum height comprised between 50 μm and 250 μm for the exchange of gases through the fiber band, while avoiding the passage of solid particles through the fiber band.

25. The cover means of claim 24, wherein the channels formed between the welding points of the welding zone of the element are characterized by a volume exchange ratio of oxygen with respect to $CO_2$ of between 2 and 5 hours$^{-1}$.

26. The cover means of claim 24 for the exchange of gases between a first medium and a second medium, in which the channels for the exchange of gases through the fiber have first ends attached to a first portion of the band and second ends attached to a second portion of the band, said first portion being open towards a first medium, while said second portion is open towards a second medium, so that the exchange of gases between the first medium and the second medium is carried out through said channels and said first and second portions of the band.

27. A plastic bag for containing sterilized material, at least a part of said bag consisting of an element comprising a first layer and a second layer welded together with interposition of a band of fibres, so as to form a plurality of adjacent welding lines, which are separated the one from the other, the fibres of the band having a melting temperature at most 5° C. higher than the melting temperature of the said layers, whereby at the welding lines, fibres of the band are molten into the welding lines, so that between two adjacent welding lines,-fibres of the band are not molten and form a channel for the exchange of gases but avoiding the passage of solid particles.

28. The bag of claim 27, in which parts of fibres of the band forming a channel are attached to at least one welding line.

29. The bag of claim 27, in which the band of fibres is a band of fibres and in which a plurality of channels are formed, each channel having a substantially lenticular cross section and a central axis, said channel s extending between two adjacent welding lines, some fibres of the band of a channel which extends in a direction forming an angle of 45 to 90° with respect to the central axis being attached the two adjacent welding lines of said channel.

30. A process for the manufacture of an element an element with a determined gas permeability, said element comprising a first layer and a second layer connected the one to the other by a welding zone wherein the first layer and the second layer are welded together with interposition of a band of fibres at welding points, the fibres of the band having a melting temperature at most 5° C. higher than the melting temperature of at least one of said layers, whereby, at the welding points of the welding zone, fibres of the band are molten into the welding points, while between two adjacent welding points of the welding zone, fibres of the band are not molten, whereby a plurality of adjacent welding points are formed and separated the one from the other, so as to form in the band of fibres of the welding zone, channels for the exchange of gases through the fiber band, while avoiding the passage of solid particles through the fiber band, said process comprising the following steps:
   a) insertion of the band of fibres between the two layers,
   b) welding together the two layer with interposition of the band of fibres so as to form a welding zone comprising welding points in which fibres are molten and so as to form between adjacent welding points of the welding zone passages consisting of portions of the band of fibres of the welding zone which do not melt during the welding.

31. The process of claim 30, in which the first layer and the second layer are welded together in the welding zone with interposition of a band of fibres, so as to form in the welding zone a plurality of adjacent welding lines, which are separated the one from the other so as to form a plurality of channels in the fibres band of the welding zone for the exchange gases through the fiber band, while avoiding the passage of solid particles through the fiber band.

32. The process of claim 30, in which the band of fibres is compressed between the films before welding and is maintained compressed during the welding.

33. The process of claim 30, in which the films are stretched during the welding.

34. The process of claim 30, in which the band of fibres is compressed between the films before welding and is maintained compressed during the welding, the compressed band having a thickness corresponding to at most 75% of the thickness of the band before being compressed.

35. A process for the manufacture of an element an element with a determined gas permeability, said element comprising a first layer and a second layer connected the one to the other by a welding zone wherein the first layer and the second layer are welded together with interposition of a band of fibres at welding points, the fibres of the band having a melting temperature at most 5° C. higher than the melting temperature of at least one of said layers, whereby, at the welding points of the welding zone, fibres of the band are molten into the welding points, while between two adjacent welding points of the welding zone, fibres of the band are not molten, whereby a plurality of adjacent welding points are formed and separated the one from the other, so as to form in the band of fibres of the welding zone, channels with a substantially lenticular cross section with a maximum height comprised between 50 $\mu$m and 250 $\mu$m for the exchange of gases through the fiber band, while avoiding the passage of solid particles through the fiber band, said process comprising the following steps a) insertion of the band of fibres between the two layers, b) welding together the two layer with interposition of the band of fibres so as to form a welding zone comprising welding points in which fibres are molten and so as to form between adjacent welding points of the welding zone channels consisting of portions of the band of fibres of the welding zone which do not melt during the welding, said channels having a substantially lenticular cross section with a maximum height comprised between 50 $\mu$m and 250 $\mu$m.

* * * * *